June 5, 1928.
Re. 16,985
E. SHULTZ
STEAM HEATING SYSTEM
Original Filed June 12, 1926
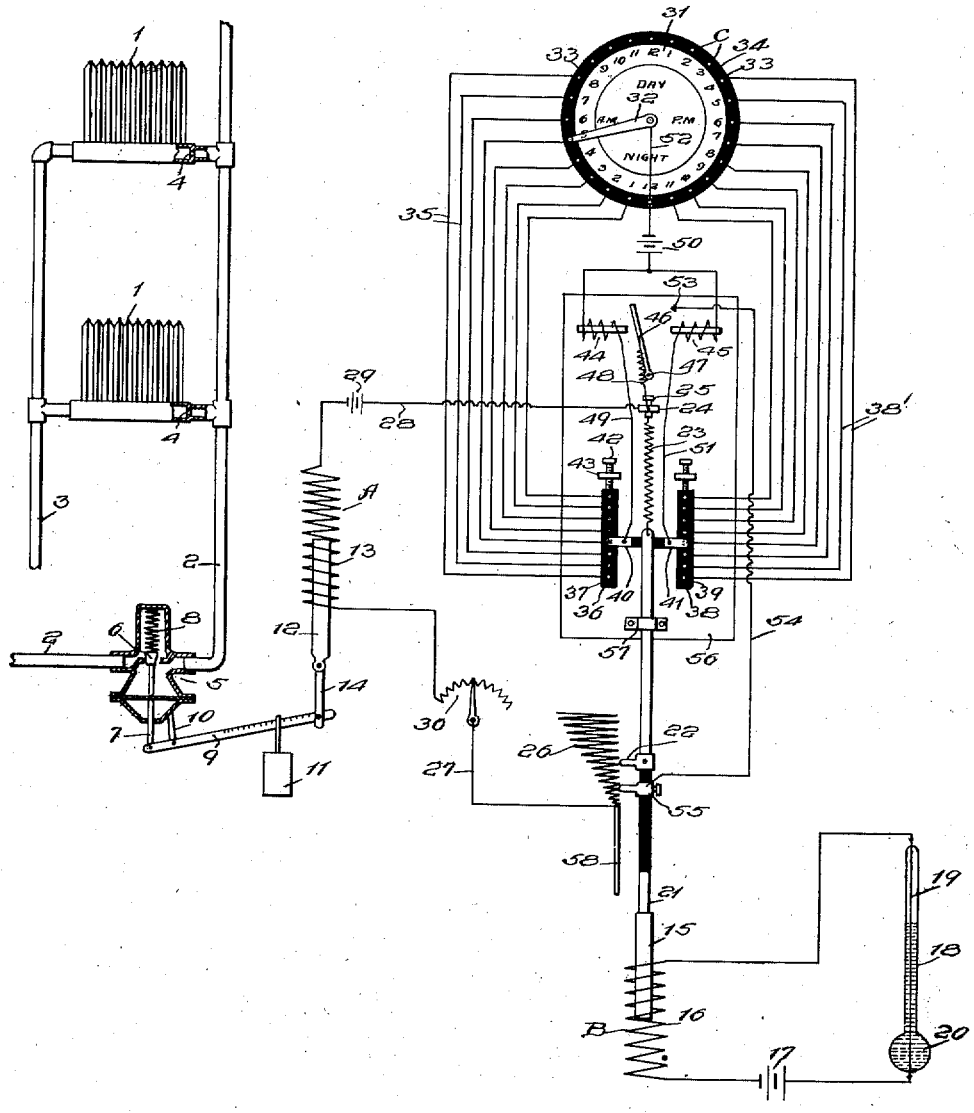
Witness:
William P. Kilroy
Inventor:
Earle Shultz
By Brown Jackson Boettcher & Dienner
Attys.

Reissued June 5, 1928.

Re. 16,985

UNITED STATES PATENT OFFICE.

EARLE SHULTZ, OF CHICAGO, ILLINOIS, ASSIGNOR TO WARREN WEBSTER & COMPANY, OF CAMDEN, NEW JERSEY, A CORPORATION OF NEW JERSEY.

STEAM-HEATING SYSTEM.

Original No. 1,654,759, dated January 3, 1928, Serial No. 115,624, filed June 12, 1926. Application for reissue filed February 25, 1928. Serial No. 257,040.

This invention relates to an improved system whereby the quantity of heat supplied to the heating system of a building, in order to maintain in that building a constant temperature, is automatically regulated to be the amount necessary to replace the heat losses from the building caused by the difference in temperature between the interior of the building and the exterior air, and by means of which the quantity of heat supplied to a building during the night, or other periods of limited or non-use, can be automatically reduced or shut off entirely for a length of time dependent upon the difference between the inside and outside temperatures. The important object of the invention is to accomplish these results by means of simple and efficient mechanism and arrangement operating entirely automatically under the control of temperature and time.

My improved regulating system is applied to heating systems in which a heating element such as steam is supplied to heating units such as radiators. Each radiator is, in accordance with my regulating system, provided with a restricted or metered inlet orifice, and in the steam supply pipe for the radiators is inserted a pressure regulator or reducing valve which is so set or adjusted, that if unhindered, it will permit flow of steam at the maximum pressure needed to supply the maximum quantity of heat to the heating system. With this pressure regulator I associate an operating member or adjustment varying member preferably in the form of a solenoid whose energizing circuit is in turn controlled by a relay solenoid, and for controlling the operation of this relay solenoid, I adjust its electrical circuit by a temperature controlled regulator subjected preferably to the temperature outside of the building in which the heating is being regulated.

There are times, as for example during the night, when it may be desirable to reduce or to shut off the heating entirely. I also provide as part of my system a regulator which is controlled conjointly by the outside temperature and the time to modify the operation of the operating solenoid to cause the reduction in or shutting off of the heat supplied to the radiators. This regulator means automatically determines the portion of the day during which normal heat shall be supplied and that portion of the day or night during which the supply shall be reduced or cut off.

Another important object of the invention is to provide such structure and arrangement that, upon failure of any of the various regulating devices to operate properly, the heat will be turned on full, thus preventing any damage to the heating system or the building by freezing.

Referring now to the drawings, the figure represents diagrammatically the various operating and controlling elements, electrical circuits therefor and the cooperation thereof to produce the results hereinbefore enumerated.

The heating system shown comprises the radiator units 1 connected with a supply pipe 2 and with a return pipe 3 through which the condensed steam goes back to the boiler. In the steam inlet of each radiator is a restricted orifice 4 which may be in the form of a metering bushing or nozzle structure ordinarily used for restricting the flow of fluid.

Interposed in the steam supply pipe 2 is the pressure regulator or reducing valve structure 5 which may be of any standard make, and by means of which is regulated the pressure under which steam will flow to the radiators of the heating system. In the type of valve structure shown, the valve plug 6 is secured on the stem 7, a spring 8 pressing against the valve plug and tending to hold it in closed position. At its lower end the valve stem is pivoted to the inner end of a balance lever 9 which close to the valve stem pivot connection is pivoted on the bracket 10 extending from the valve frame, the outer end of the lever adjustably receiving the weight 11. In accordance with my invention, this weight is placed and remains at that point on the lever at which the valve 6 will be positioned to permit the steam to flow at the maximum pressure needed to supply the maximum quantity of heat to the heating units. The operation of my system then contemplates modification of such valve setting or adjustment under control of the outside temperature and the time.

The operating solenoid A forms part of the control for the pressure regulating valve and is directly associated therewith. It comprises the solenoid core 12 and the energizing winding 13, the core being connected by a link 14 with the outer end of the valve lever 9. The solenoid, under varying degree of energization, will oppose the pull of the weight 11 so that the arm will be raised and lowered to vary the adjustment of the pressure regulator valve structure 5.

The operating solenoid is controlled in accordance with the variation in the temperature of the outside air by the regulation of the resistance of the solenoid energizing circuit by means of a relay solenoid B, whose operation is directly controlled by variations in the temperature of the outside air. This relay solenoid comprises a core 15 and an energizing winding 16, this winding being included in the energizing circuit which includes a battery 17 and a temperature responsive member 18. This temperature responsive member may be of any special or standard design. That shown is in the form of a thermometer tube through which extends a resistance wire 19 and in which is mercury 20. The resistance wire is included in the energizing circuit for the relay B and as the mercury rises and falls in the tube, due to changes in temperature, more or less of the resistance wire will be short circuited by the mercury and the resistance in the relay energizing circuit thus correspondingly decreased or increased.

The relay core 15 has a rod 21 extending upwardly therefrom which carries a contact finger 22 in electrical engagement therewith. Extending from the upper end of the rod 21 is a spring 23 which is adjustably anchored to a supporting bracket 24 by means of a screw 25. This spring acts in opposition to the magnetic pull of the energizing winding 16 on the core 15 and tends to hold the core out of the winding. The spring and the energizing winding thus together control the vertical movement of the rod 21.

Adjacent to the path of the contact finger 22 is a resistance coil 26 with which the contact finger engages during vertical movement of the rod 21. The lower end of this resistance coil is connected by the conductor 27 with one terminal of the energizing winding 13 of the solenoid A, the other terminal of the winding connecting through conductor 28 with the supporting bracket 24, a battery 29 being included in the conductor 28. As the rod 21 is vertically moved, more or less of the resistance 26 will be included in the energizing circuit for the relay A, such circuit being from the battery 29 through conductor 28, spring 23, rod 21, contact finger 22, resistance 26, conductor 27, and through the solenoid winding back to the battery. As the pressures required in the heat carrying medium, such as steam, do not vary in simple proportion to the difference in temperature between the inside and outside of the building to be heated, but as a power of that difference, the resistance 26 has its turns graduated and, in the arrangement shown, the diameters of the turns increase toward the upper end of the resistance coil so that the resistance will increase more rapidly as the outside temperature falls. Such rapid acceleration of the resistance 26 as the temperature falls will correspondingly reduce the current flow through the energizing circuit of the solenoid A which will then permit the pressure regulating valve to quickly increase the supply of steam to the radiators. To assist in the proper adjustment of the energizing circuit for the solenoid A, a manually adjustable resistance device 30 may be included in the energizing circuit.

Thus the amount of heat supplied to the radiators is automatically regulated in proportion to variations in outside temperature, as indicated by the thermometer 18. During the day normal heat control is desirable, but during the night, or certain parts thereof, it may be desirable to materially reduce or to entirely cut off the heat supply. Such modification of heat adjustment is accomplished by a time controlled regulator C in cooperation with the temperature controlled relay solenoid B. The time controlled regulator comprises a clock 31 whose hour hand 32 makes one revolution in 24 hours. As the hand revolves, it makes consecutive wiping contact with contact pins 33 selectively set at the time divisions of the clock dial, the annular panel 34 of insulating material being shown as supporting these contact pins and insulating them from each other. I have shown contact pins set at the divisions for the hours 1 to 8 a. m., and the hours 4 to 11 p. m. The pins for the hours 1 to 8 are connected by the conductors 35 with a vertical row of contact buttons 36 on a bar 37 of insulating material positioned adjacent to the upper end of the solenoid rod 21 at the left side thereof. Similarly, conductors 38′ connect the pins for the hours 4 to 11 with the vertical row of contact buttons 38 on the bar 39 positioned opposite the bar 36 at the right of the rod 21. Each bar thus has eight pins and the pins of the opposite rows are horizontally aligned. Contact blades 40 and 41 extend laterally in opposite directions from the upper end of the rod 21 for engagement, respectively, with the contact buttons 36 and 38 as the solenoid rod 21 moves vertically, these blades being insulated from each other and from the rod 21. The contact button supporting bars are preferably adjustable longitudinally as by means of screws 42 mounted on supporting brackets 43.

Above the brackets 24 which support the balancing spring 23 for the relay core 15 are the electromagnets 44 and 45 between the end of whose poles is pivoted the armature tongue 46, the pivot point 47 for this tongue being above the bracket 24 and in a plane midway between the opposed poles of the electromagnets 44 and 45. Above its pivot the armature tongue is connected by a tension spring 48 with the bracket 24 so that as the tongue is swung into engagement with either electromagnet pole it will be held in such position by the spring until pulled out of such position by the attraction of the other electromagnet. A conductor 49 connects the contact blade 40 with one terminal of the winding of the electromagnet 44 whose other terminal is connected with one pole of the battery 50 while a conductor 51 connects the contact blade 41 with one terminal of the winding for the electromagnet 45 whose other terminal connects with the same pole of the battery, the other pole of the battery being connected with the clock through conductor 52.

Associated with the electromagnet 45 is a contact 53 which is engaged by the armature tongue when the electromagnet is energized, and this contact is connected by conductor 54 with a contact member 55 insulated from the relay rod 21 but adjustable longitudinally thereon adjacent to the contact finger 22 and being adapted to engage with the resistance 26 as the rod 21 moves vertically.

The electromagnets 44 and 45, the contact button bars 37 and 39 and the various supporting brackets may be mounted on a panel 56 on which may also be mounted a guide fitting 57 for the relay rod 21.

With the above arrangement two sets of time circuits are formed. The first set includes the conductors 38′ and these circuits may be called "shut-off" circuits, each circuit extending from the battery 50 through the clock hand, through one of the conductors 38′, the corresponding contact button on the bar 39, the contact blade 41, conductor 51, electromagnet 45, and back to the battery. The other set of circuits includes the conductors 35 and these circuits may be called "turn-on" circuits. Each extends from the battery through the clock hand, through one of the conductors 35, the corresponding contact button on the bar 37, conductor 49, electromagnet 44, and back to the battery. The electromagnet 45 may therefore be called the "shut-off" electromagnet and electromagnet 44 may be called the "turn-on" electromagnet.

Each of the shut-off and turn-on circuits will not be complete until closed at two points, namely, at the clock, and at the contact button bars 37 and 39. On the bar 37 the contact buttons, reading downwardly, correspond with the hour pins 1 to 8, and on the bar 39, going upwardly, the contact buttons correspond with the hours 4 to 11. Therefore, when the contact blades 40 and 41 have been shifted by the solenoid B into engagement with certain contact buttons on the bars 37 and 39, the respective circuits will not be closed until the hour hand engages with the time pins connected with the respective contact buttons. As the contact blades 40 and 41 receives their movement from the solenoid B, the particular contact buttons 36 and 38 engaged thereby is dependent upon outside temperature, and as the contact buttons are connected, each with a particular contact pin on the clock, it follows that the first closure of a shut-off or turn-on circuit in accordance with temperature will determine the time at which such circuit will have its final closure made by the clock hand. The warmer the outside temperature, the earlier the shut-off circuit will be closed, and the warmer the outside temperature, the later the turn-on circuit will be closed.

When a shut-off circuit is closed, the electromagnet 45 will be energized and will draw the armature tongue 46 against the contact 53 and this closes a shunt circuit including the contact member 55, conductor 54, contact 53, armature tongue 46, spring 48, and the bracket 24. When the shunt path is closed, the energizing current for solenoid A, instead of flowing through the spring 23, rod 21 and contact finger 22 to the resistance 26, will flow through the shunt path to the resistance at a point below the engagement of the contact finger 22 with the resistance so that the current flow through the energizing circuit will be increased proportionate to the resistance removed from the circuit and measured by that part of the resistance coil 26 between the contacts 22 and 55. Such reduction in resistance causes increase of the current flow through the energizing circuit and greater attraction of the solenoid core 12 so that the pressure regulating valve will be adjusted to reduce the steam flow.

The contact member 55 being adjustable relative to the contact finger 22, the degree of resistance reduction can be adjusted for. In order to maintain closure of the shunt circuit when the contact member 55 is carried below the end of the resistance coil 26 the lower terminal of the resistance may be extended by means of a metal bar 58. This bar should have a length not less than the length of the coil 26 so that if the contact member 55 is adjusted to be at a distance from the contact finger 22 equal to the length of the coil 26, it will always make contact with the extension 58 and never with the resistance 26, no matter what the position of the rod 21 may be during its range of movement. If the contact member 55 is at a less distance from the contact finger 22, it will either make contact with resistance 26 or with the extension 58, depending upon the position of the rod 21. As soon as a turn-on circuit is closed, the electromagnet 44 will withdraw the armature tongue from the contact 53 to open the shunt circuit, and the energizing circuit for the solenoid A will be controlled directly by the movement of the contact finger 22 to effect normal heating regulation. The time controlled regulator thus determines during what portion of the day there shall be normal heat regulation and during which part of the day or night the heat supply shall be reduced or cut off.

Briefly reviewing the operation, the drawing shows the 5 o'clock a. m. turn-on circuit closed, which means that the temperature is such at 5 o'clock in the morning that the heating system should begin its operation under normal control. If the outside temperature were lower the current flow through the solenoid B would be less and the rod 21 would be correspondingly raised by the spring 23 to set the turn-on circuit for final closure by the clock. For example, if the rod 21 had been raised to the button connected with the three o'clock pin, then when this pin were engaged by the hour hand at 3 o'clock a. m. the shunt circuit would have been broken and the heating system restored to normal control. If the outside temperature were high, the turning on of the system for normal regulation would be delayed.

The normal regulation continues usually during the day, and reduction or shut-off of the heat is desirable at night at a time depending upon the outside temperature. In the arrangement shown on the drawing, the 7 o'clock p. m. shut-off circuit is set by the solenoid B ready for final closure by the clock and the circuit will be closed at 7 o'clock in the afternoon with the resulting closure of the shunt circuit and corresponding reduction in the steam supply. When the temperature is high, the shut-off circuit may be closed as early as 4 o'clock, and when the outside temperature is comparatively low, closure of the shut-off circuit may be delayed until say 11 o'clock p. m.

It will be noted that in the case of accidental opening of the energizing circuit for the solenoid B, the spring 23 would raise the rod 21 to cause the contact finger 22 to include all the resistance 26 in the energizing circuit for the operating solenoid A so as to de-energize this solenoid and permit the weight 11 to adjust the pressure controlling valve for the full flow of steam. Likewise, should the energizing circuit for the solenoid A accidentally become interrupted, the solenoid would be de-energized and the pressure regulating valve would turn the steam on full. The heating system would, therefore be protected against freezing during cold weather should such accidental current interruption occur.

I thus produce a simple, reliable and efficient regulation system which, in accordance with variations in outside temperatures, accurately controls the supply of heating element to heating units, and which automatically reduces or entirely shuts off the heat supply to the units during desired time periods.

I claim as follows:—

1. In a heating regulation system, the combination with a pressure regulating valve for regulating the pressure of fluid heating medium, of an operating electromagnetic device connected with said valve to control the operation thereof, an energizing circuit for said electromagnetic device, an electromagnetic relay controlling the resistance of said energizing circuit, an energizing circuit for said relay, and a device responsive to outside temperature for controlling said relay circuit whereby said operating electromagnet will control said valve in accordance with variations in outside temperature.

2. In a heating regulation system, the combination with a regulating valve for regulating the flow of heating fluid to a heating system, an electromagnet device connected with said valve to control the operation thereof, an energizing circuit for said device, means automatically controlled in accordance with variation in outside temperature for adjusting the resistance of said energizing circuit, and time controlled means for automatically modifying said energizing circuit at predetermined time periods.

3. In a heating regulation system, the combination with a regulating valve for controlling the flow of heating fluid, of an electromagnetic device connected with said valve to control the operation thereof, an energizing circuit for said electromagnetic device, a variable resistance for said circuit, means controlled by outside temperature for adjusting said resistance, and time controlled means for automatically modifying said resistance at predetermined time periods.

4. The combination with a heating system, of a regulating valve, an operating electromagnet device for operating said valve, an energizing circuit for said device, and temperature controlled and time controlled mechanisms cooperating to adjust the resistance of said energizing circuit and thereby control the operation of said operating device.

5. The combination with a heating system, of a regulating valve for controlling the flow of heating medium to said system, an electromagnetic operating device connected to control the operation of said valve, an energizing circuit for said device, a resistance for said circuit, means controlled in accordance with outside temperature for adjusting said resistance, and time controlled means cooperating with the temperature controlled means for short circuiting part of said resistance at predetermined times.

6. The combination with a heating system, of a regulating valve for regulating the flow of heating fluid, an electromagnetic operating device connected with said valve to control the operation thereof, an energizing circuit for said device, a variable resistance for said circuit, a relay electromagnet associated with said resistance to control inclusion thereof in said circuit, an energizing circuit for said relay automatically controlled in accordance with outside temperature, a shunt circuit for shunting part of said resistance, and time and temperature controlled means cooperating to determine the closure of said shunt circuit.

7. The combination with a heating system, of a regulating valve for regulating the flow of heating fluid, an electromagnetic operating device connected with said valve to control the operation thereof, an energizing circuit for said device, a resistance for said circuit for controlling the current flow therethrough, a shunt circuit associated with said resistance, and clock controlled means for controlling the connection of said shunt circuit.

8. The combination with a heating system, of a regulating valve for regulating the flow of heating fluid to the system, an electromagnetic operating device connected with said regulating valve to control the operation thereof, an energizing circuit for said device, a variable resistance for said circuit, temperature controlled means for controlling the adjustment of said resistance, decrease of said resistance causing said operating device to control the valve to decrease the heating fluid supply, a shunt circuit associated with said resistance, and clock controlled means governing the connection of said shunt circuit, closure of the shunt circuit decreasing the resistance independently of said resistance adjusting mechanism.

9. In an automatically regulated heating system, the combination of heating units each having a restricted inlet opening so proportioned that the quantity of heat carrying medium admitted to the unit can be regulated by variations in pressure in the heat carrying medium, a pressure regulator for varying the pressure in the heat carrying medium, and a temperature controlled regulator for automatically controlling said pressure regulator.

10. In an automatically regulated heating system, the combination of heating units each having restricted inlet openings so proportioned that the quantity of heat carrying medium admitted to the unit can be regulated by variations in pressures in the heat carrying medium, a pressure regulator for varying the pressure in the heat carrying medium, operating means for automatically controlling the operation of said regulator, means dependent upon outside temperature for controlling the operation of said operating means, and additional means controlled conjointly by outside temperature and timed for modifying the operation of said operating means to cause operation of said pressure regulator to reduce during a certain predetermined time period the quantity of heat supplied to the unit.

11. In combination with a heating system comprising heating units, a pressure regulator for varying the pressure in the heat carrying medium, operating means for operating said pressure regulator, means dependent on outside temperature for automatically controlling the operation of said operating means to cause operation of the pressure regulator in accordance with outside temperature, and additional means controlled by time and dependent upon outside temperature for modifying the operation of the operating means during predetermined time periods to cause adjustment of the pressure regulator to shut down the quantity of heat supplied to the heating system.

12. The combination with a heating system, of a regulator for controlling the flow of heating medium to said system, an electromagnetic operating device connected with said regulator to control the operation thereof, an energizing circuit for said device, a variable resistance in said circuit, a relay electromagnet device and a contact moved thereby in association with said resistance, an energizing circuit for said relay electromagnet and a device responsive to outside temperature for controlling the current flow through said energizing circuit whereby said resistance will be adjusted to control the energizing circuit for the operating electromagnet in accordance with outside temperature, an additional contact adapted to travel with said first mentioned contact in association with said resistance, a shunt circuit including both contacts, coils in said shunt circuit causing short circuiting of that part of the resistance which is between said contacts whereby the operation of said operating device will be modified, and time controlled means closing said shunt circuit at a certain time, dependent upon the outside temperature at such time.

13. In combination with a heating system comprising heating units, of a regulator for regulating the flow of heating medium to said units, an electromagnetic operating device connected with said regulator to control the operation thereof, an energizing circuit for said operating electromagnet, increased current flow through said circuit causing operation of said device to adjust said regulator for decreased flow of heating medium, a variable resistance for said circuit, a movable contact member associated with said resistance, means controlled by outside temperature for moving said contact whereby to vary the amount of said resistance in said energizing circuit, an additional contact movable with said first mentioned contact, a shunt circuit for including said contacts and that part of the resistance between said contacts, an electromagnet controlling the closure of said shunt circuit, a plurality of shut-off circuits each including said electromagnet, a time device for causing a shut-off circuit at a certain time dependent upon the outside temperature at that time whereby the shunt circuit will be closed and the resistance in said energizing circuit reduced to cause operation of the operating device to adjust said regulator for decreased flow of heating medium, and a second electromagnet controlling the opening of said shunt circuit, turn-on circuits each including said second electromagnet, and a time device for causing a circuit through said second electromagnet at a certain time dependent upon the temperature at such time whereby said shunt circuit will be opened and current flow through said operating device restored to normal.

14. In combination with a heating system comprising heating units, a regulating valve for regulating the flow of heating medium to the unit, an electromagnetic operating device controlling the adjustment of said regulating valve, an energizing circuit for said device, means dependent upon outside temperature for regulating the current flow through said energizing circuit, and additional means controlled by time and outside temperature for modifying the current flow through said energizing circuit during a certain period whereby to cause adjustment of the regulator valve to decrease the quantity of heating medium flowing to the heating system during such period.

15. In combination in a heating system, a plurality of radiators, a common supply main for supplying heating fluid to said radiators, each radiator being connected to the supply main through a regulable but normally fixed orifice to control the rate of flow to the respective radiators for a given pressure in the supply main, and means responsive to temperature to regulate the pressure of the heating fluid in said mains.

16. In a heating system, the combination of a supply main for heating fluid, a plurality of radiators having connection with said main through orifices for controlling the relative flow of heating fluid to each radiator, a pressure regulator in the supply main for maintaining a given pressure of the heating fluid supplied to said orifices, and means responsive to temperature for controlling the setting of said regulator.

17. In a heating system, a radiator having a fixed orifice to control the inlet of heating fluid thereto, a supply main for heating fluid to be supplied to said orifice, a pressure regulator for holding a predetermined pressure upon said orifice, and temperature responsive means for controlling the setting of said regulator so that the rate of flow of heating fluid through the orifice to the radiator is adjusted to the requirements for heat to be given off by the radiator.

18. In a heating system, the combination of radiators each having a restricted inlet opening so proportioned that the quantity of heat carrying medium admitted thereto can be regulated by variations in the pressure of the heat carrying medium, an automatic pressure regulator for varying the pressure of the heat carrying medium, adjustment varying means for varying the adjustment of said automatic pressure regulator, and temperature controlled means governing said adjustment varying means.

19. In a steam heating system, the combination of radiators each having a restricted inlet opening so proportioned that the quantity of steam admitted thereto can be regulated by variations in the pressure of the heat carrying medium, an automatic regulator for varying the pressure of the steam, and means for automatically varying the setting of the pressure regulator commensurate with variations of temperature.

20. In a heating system, the combination of radiators each having a restricted inlet opening so proportioned that the quantity of heat carrying medium admitted thereto can be regulated by variations in the pressure of the heat carrying medium, an automatic pressure regulator for controlling the pressure in the heat carrying medium, regulable means for varying the setting of the pressure regulator, and temperature controlled means governing such regulable means whereby it may automatically vary the setting of the pressure regulator commensurate with variations in temperature.

21. In a heating system for a building, the combination of a plurality of radiators therein each having a restricted inlet opening so proportioned that the quantity of heat carrying medium admitted thereto can be regulated by variations in the pressure thereof, an automatic regulator for varying the pressure of the heat carrying medium, adjustment varying means for varying the adjustment of said pressure regulator, and thermally sensitive means exposed to variations in temperatures external to the building for governing the adjustment varying means.

22. In a heating system for a building, the combination of a plurality of radiators therein each having an inlet opening so proportioned that the quantity of heat carrying medium admitted thereto can be regulated by variations in the pressure of the heat carrying medium, an automatic pressure regulator for varying the pressure of the heat carrying medium, regulable means for varying the setting of the pressure regulator, and temperature controlled means governing said regulable means whereby it may automatically vary the setting of the pressure regulator commensurate with variations in the atmospheric conditions external to the building.

23. In a heating system, the combination of heating units having each a restricted inlet opening so proportioned that the quantity of heat carrying medium admitted thereto can be regulated by variations in the pressure of the heat carrying medium, a pressure regulator for varying the pressure of the heat carrying medium, means for loading said regulator to a variable degree comprising motor means and a temperature controlled device for governing the action of said motor means.

24. In a heating system, the combination of radiators each having a restricted inlet opening so proportioned that the quantity of heat carrying medium admitted thereto can be regulated by variations in the pressure of the heat carrying medium, an automatic pressure regulator loaded to a variable degree for varying the pressure of the heat carrying medium, means for loading said regulator to a variable degree comprising motor means and a temperature controlled device for governing the action of said motor means.

25. In a heating system for a building, the combination of heating units each having a restricted inlet opening so proportioned that the quantity of heat carrying medium admitted thereto can be regulated by variations in the pressure of the heat carrying medium, a loaded diaphragm pressure regulating valve for automatically regulating the pressure of the heat carrying medium, means for varying the loading of said valve comprising motor means and a temperature controlled device subject to temperature outside of the building for governing the action of said motor means.

In witness whereof, I hereunto subscribe my name this 1st day of February, 1928.

EARLE SHULTZ.

DISCLAIMER

Re. 16,985.—*Earle Shultz*, Chicago, Ill. STEAM HEATING SYSTEM. Patent dated June 5, 1928. Disclaimer filed December 10, 1934, by the assignee, *Warren Webster & Company*.

Hereby enters this disclaimer to those claims which are numbered 9, 15, 16, 17, 18, 19, 20, 21, 22, 23, 24 and 25 in said reissue patent, and which are in the following words, to wit:

"9. In an automatically regulated heating system, the combination of heating units each having a restricted inlet opening so proportioned that the quantity of heat carrying medium admitted to the unit can be regulated by variations in pressure in the heat carrying medium, a pressure regulator for varying the pressure in the heat carrying medium, and a temperature controlled regulator for automatically controlling said pressure regulator."

"15. In combination in a heating system, a plurality of radiators, a common supply main for supplying heating fluid to said radiators, each radiator being connected to the supply main through a regulable but normally fixed orifice to control the rate of flow to the respective radiators for a given pressure in the supply main, and means responsive to temperature to regulate the pressure of the heating fluid in said mains.

"16. In a heating system, the combination of a supply main for heating fluid, a plurality of radiators having connection with said main through orifices for controlling the relative flow of heating fluid to each radiator, a pressure regulator in the supply main for maintaining a given pressure of the heating fluid supplied to said orifices, and means responsive to temperature for controlling the setting of said regulator.

"17. In a heating system, a radiator having a fixed orifice to control the inlet of heating fluid thereto, a supply main for heating fluid to be supplied to said orifice, a pressure regulator for holding a predetermined pressure upon said orifice, and temperature responsive means for controlling the setting of said regulator so that the rate of flow of heating fluid through the orifice to the radiator is adjusted to the requirements for heat to be given off by the radiator.

"18. In a heating system, the combination of radiators each having a restricted inlet opening so proportioned that the quantity of heat carrying medium admitted thereto can be regulated by variations in the pressure of the heat carrying medium, an automatic pressure regulator for varying the pressure of the heat carrying medium, adjustment varying means for varying the adjustment of said automatic pressure regulator, and temperature controlled means governing said adjustment varying means.

"19. In a steam heating system, the combination of radiators each having a restricted inlet opening so proportioned that the quantity of steam admitted thereto can be regulated by variations in the pressure of the heat carrying medium, an automatic regulator for varying the pressure of the steam, and means for automatically varying the setting of the pressure regulator commensurate with variations of temperature.

"20. In a heating system, the combination of radiators each having a restricted inlet opening so proportioned that the quantity of heat carrying medium admitted thereto can be regulated by variations in the pressure of the heat carrying medium, an automatic pressure regulator for controlling the pressure in the heat carrying medium, regulable means for varying the setting of the pressure regulator, and temperature controlled means governing such regulable means whereby it may automatically vary the setting of the pressure regulator commensurate with variations in temperature.

"21. In a heating system for a building, the combination of a plurality of radiators therein each having a restricted inlet opening so proportioned that the quantity of heat carrying medium admitted thereto can be regulated by variations in the pressure thereof, an automatic regulator for varying the pressure of the heat carrying medium, adjustment varying means for varying the adjustment of said pressure regulator, and thermally sensitive means exposed to variations in temperatures external to the building for governing the adjustment varying means.

"22. In a heating system for a building, the combination of a plurality of radiators therein each having an inlet opening so proportioned that the quantity of heat carrying medium admitted thereto can be regulated by variations in the pressure of the heat carrying medium, an automatic pressure regulator for varying the pressure of the heat carrying medium, regulable means for varying the setting of the pressure regulator, and temperature controlled means governing said regulable means whereby it may automatically vary the setting of the pressure regulator commensurate with variations in the atmospheric conditions external to the building.

"23. In a heating system, the combination of heating units each having a restricted inlet opening so proportioned that the quantity of heat carrying medium admitted thereto can be regulated by variations in the pressure of the heat carrying medium, a pressure regulator for varying the pressure of the heat carrying medium, means for loading said regulator to a variable degree comprising motor means and a temperature controlled device for governing the action of said motor means.

"24. In a heating system, the combination of radiators each having a restricted inlet opening so proportioned that the quantity of heat carrying medium admitted thereto can be regulated by variations in the pressure of the heat carrying medium, an automatic pressure regulator loaded to a variable degree for varying the pressure of the heat carrying medium, means for loading said regulator to a variable degree comprising motor means and a temperature controlled device for governing the action of said motor means.

"25. In a heating system for a building, the combination of heating units each having a restricted inlet opening so proportioned that the quantity of heat carrying medium admitted thereto can be regulated by variations in the pressure of the heat carrying medium, a loaded diaphragm pressure regulating valve for automatically regulating the pressure of the heat carrying medium, means for varying the loading of said valve comprising motor means and a temperature controlled device subject to temperature outside of the building for governing the action of said motor means."

[*Official Gazette, January 1, 1935.*]